(12) United States Patent
Bobbitt et al.

(10) Patent No.: US 11,363,094 B2
(45) Date of Patent: Jun. 14, 2022

(54) EFFICIENT DATA PROCESSING IN A MESH NETWORK OF COMPUTING DEVICES

(71) Applicant: International Business Machines Corporation, Armonk, NY (US)

(72) Inventors: Russell Patrick Bobbitt, New York, NY (US); Florian Pinel, New York, NY (US); Peter Alan Coldicott, Jonestown, TX (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 16/933,892

(22) Filed: Jul. 20, 2020

(65) Prior Publication Data

US 2022/0021729 A1   Jan. 20, 2022

(51) Int. Cl.
| H04N 5/225 | (2006.01) |
| H04L 67/10 | (2022.01) |
| G06F 9/50 | (2006.01) |
| H04N 5/232 | (2006.01) |
| H04L 41/0826 | (2022.01) |
| H04L 41/0816 | (2022.01) |
| H04L 67/12 | (2022.01) |

(52) U.S. Cl.
CPC ............ *H04L 67/10* (2013.01); *G06F 9/5083* (2013.01); *H04L 41/0816* (2013.01); *H04L 41/0826* (2013.01); *H04L 67/12* (2013.01); *H04N 5/23229* (2013.01)

(58) Field of Classification Search
CPC . H04L 67/10; H04L 41/0816; H04L 41/0826; H04L 67/12; G06F 9/5083; H04N 5/23229
See application file for complete search history.

(56) References Cited

U.S. PATENT DOCUMENTS

| 8,321,870 | B2 | 11/2012 | Messier et al. |
| 9,632,838 | B2* | 4/2017 | Ng .......................... G06F 9/5072 |
| 9,704,393 | B2 | 7/2017 | Acharya et al. |
| 10,417,554 | B2 | 9/2019 | Scheffler |
| 2006/0095539 | A1 | 5/2006 | Renkis |
| 2008/0184245 | A1 | 7/2008 | St. Jean |
| 2014/0188978 | A1* | 7/2014 | Ng .......................... H04L 67/10 |
| | | | 709/203 |

(Continued)

OTHER PUBLICATIONS

"Distributed Placement of Machine-Learning Computing in an Edge Network", Disclosed Anonymously, IP.com No. IPCOM000254862D, IP.com Electronic Publication Date: Aug. 9, 2018, 10 pages.

(Continued)

*Primary Examiner* — Cheikh T Ndiaye

(74) *Attorney, Agent, or Firm* — Sonny Z. Zhan

(57) ABSTRACT

In an approach for efficient data processing in a mesh network of computing devices, a processor receives data to be processed in the mesh network. A processor distributes a set of computational units to a set of computing devices in the mesh network. A processor creates a computational plan to construct a computational pipeline of the set of computational units. The computational plan considers cost and performance trade-offs by considering limitation of hardware resources, processing speed, accuracy and application requirements. A processor executes the computational plan by sending data to assigned computational units.

17 Claims, 11 Drawing Sheets

(56) References Cited

U.S. PATENT DOCUMENTS

| | | | |
|---|---|---|---|
| 2015/0256435 A1* | 9/2015 | Sum | H04L 41/0896 702/62 |
| 2016/0328644 A1 | 11/2016 | Lin et al. | |
| 2018/0152361 A1* | 5/2018 | Chu | H04L 41/0896 |
| 2019/0042867 A1* | 2/2019 | Chen | G06N 3/063 |
| 2019/0065252 A1* | 2/2019 | San Miguel | G06F 9/45533 |
| 2019/0273902 A1 | 9/2019 | Varekamp et al. | |

OTHER PUBLICATIONS

"Knapsack problem", From Wikipedia the free encyclopedia, This page was last modified on This page was last edited on Mar. 10, 2020, 6 pages, <https://en.wikipedia.org/wiki/Knapsack_problem>.

"Method and System for Generating a Distributed Video Buffering Plan", Disclosed Anonymously, An IP.com Prior Art Database Technical Disclosure, IP.com No. IPCOM000238807D, IP.com Electronic Publication Date: Sep. 18, 2014, 4 pages.

"Network Visualization Tool Using 3D Visual Diagrams to Describe Virtual Network Functions", Disclosed Anonymously, An IP.com Prior Art Database Technical Disclosure, IP.com No. IPCOM000248148D, IP.com Electronic Publication Date: Nov. 1, 2016, 21 pages.

"Processing and Transforming Collected Data for Improved Visualization", Disclosed Anonymously, An IP.com Prior Art Database Technical Disclosure, IP.com No. IPCOM000232510D, IP.com Electronic Publication Date: Nov. 14, 2013, 16 pages.

Abas et al., "SCmesh: Solar-Powered Wireless Smart Camera Mesh Network", Jul. 2015, 9 pages, <Powered_Wireless_Smart_Camera_Mesh_Network/links/55944c3f08ae21086d1ed04f/SCmesh-Solar-Powered-Wireless-Smart-Camera-Mesh-Network.pdf>.

Bienia et al., "The Parsec Benchmark Suite: Characterization and Architectural Implications", Princeton University Technical Report TR-811-08, Jan. 2008, 22 pages.

Gordon, Michael, "Compiler Techniques for Scalable Performance of Stream Programs on Multicore Architectures", Submitted to the Department of Electrical Engineering and Computer Science in partial fulfillment of the requirements for the degree of Doctor of Philosophy at the Massachusetts Institute of Technology, Jun. 2010, 223 pages.

Govindaraju, V., "Energy Efficient Computing Through Compiler Assisted Dynamic Specialization", A dissertation submitted in partial fulfillment of the requirements for the degree of Doctor of Philosophy (Computer Sciences), at the University of Wisconsin-Madison, 2014, 154 pages.

Mell et al., "The NIST Definition of Cloud Computing", Recommendations of the National Institute of Standards and Technology, Special Publication 800-145, Sep. 2011, 7 pages.

Noor et al., "Community based home security system using wireless mesh network", 2013, 3 pages, <https://pdfs.semanticscholar.org/05e2/c3db5ac6129546c48296b5cc4197cfb43ce6pdf>.

Yeh et al, "Real-Time Video Surveillance over IEEE 802.11 Mesh Networks", May 2009, 11 pages, <https://www.researchgate.net/publication/224408407_Real-Time_Video_Surveillance_over_IEEE_80211_Mesh_Networks>.

* cited by examiner

```
{
  "Feed ID" : 1,
  "Last updated" : "2019-04-23T18:55:11.210Z",
  "Descriptors" : [
    { "Label" : "traffic",
      "Statistics" : [
        { "start" : "00:00:00", "end" : "00:03:59", "frequency" : 0.2 },
        { "start" : "00:04:00", "end" : "00:07:59", "frequency" : 0.4 },
        { "start" : "00:08:00", "end" : "00:11:59", "frequency" : 0.4 },
        { "start" : "00:12:00", "end" : "00:15:59", "frequency" : 0.6 },
        { "start" : "00:16:00", "end" : "00:19:59", "frequency" : 0.9 },
        { "start" : "00:20:00", "end" : "00:23:59", "frequency" : 0.2 },
      ]
    },
    { "Label" : "people",
      "Statistics" : [
        { "start" : "00:00:00", "end" : "00:03:59", "frequency" : 0.1 },
        { "start" : "00:04:00", "end" : "00:07:59", "frequency" : 0.2 },
        { "start" : "00:08:00", "end" : "00:11:59", "frequency" : 0.5 },
        { "start" : "00:12:00", "end" : "00:15:59", "frequency" : 0.45 },
        { "start" : "00:16:00", "end" : "00:19:59", "frequency" : 0.1 },
        { "start" : "00:20:00", "end" : "00:23:59", "frequency" : 0.1 },
      ]
    }
  ]
}
```

FIG. 5

DEVICE DEPLOYMENTS

| DEVICE | NAME | CATEGORY | INPUTS | OUTPUTS | ACCURACY | LATENCY | LIKELIHOOD |
|---|---|---|---|---|---|---|---|
| 1 | FASTER RCNN | OBJECT DETECTION | IMAGE | PERSON, VEHICLE | 0.79 | 100ms | 0.9 |
| 2 | YOLOv3 | OBJECT DETECTION | IMAGE | PERSON, VEHICLE | 0.75 | 15ms | 0.9 |
| 2 | CONTRAST STRETCHER | PREPROCESSOR | IMAGE | IMAGE | 0.98 | 1.5ms | 1.0 |
| 3 | COLOR CLASSIFIER | IMAGE CLASSIFIER | IMAGE, ANY OBJECT | ATTRIBUTE SCORES | 0.74 | 3ms | 1.0 |
| 3 | KLT TRACKER | TEMPORAL PROCESSOR | IMAGE SEQUENCES SET OF ANY OBJECT | OBJECT TRACKS | 0.65 | 5ms | 1.0 |

FIG. 8

EFFICIENT DATA PROCESSING IN A MESH NETWORK OF COMPUTING DEVICES

BACKGROUND

The present disclosure relates generally to the field of data processing, and more particularly to efficient video processing in a mesh network of computing devices.

A mesh network may be a type of network in which individual devices (maybe called as nodes) within the infrastructure connect directly, dynamically and non-hierarchically to as many other nodes as possible and cooperate with one another to create one virtual network that can efficiently route data between clients. A mesh network may contain routers, bridges, switches and other devices that operate as nodes. In an example, one node may act as a gateway and may connect directly to a main network. Each additional node may connect to one other and expand network coverage. While one node may be physically connected to an external resource, every node may be able to send data back and forth at equal speeds. Devices within a mesh network may be programmed with specific software.

SUMMARY

Aspects of an embodiment of the present disclosure disclose an approach for efficient data processing in a mesh network of computing devices. A processor receives data to be processed in the mesh network. A processor distributes a set of computational units to a set of computing devices in the mesh network. A processor creates a computational plan to construct a computational pipeline of the set of computational units. The computational plan considers cost and performance trade-offs by considering limitation of hardware resources, processing speed, accuracy and application requirements. A processor executes the computational plan by sending data to assigned computational units.

BRIEF DESCRIPTION OF THE DRAWINGS

FIG. 5 illustrates an exemplary feed metadata of FIG. 4, in accordance with one or more embodiments of the present disclosure.

FIG. 8 is an exemplary device deployment table 800 illustrating constructing a computational plan with the management module of the management device of FIG. 1, in accordance with one or more embodiments of the present disclosure.

DETAILED DESCRIPTION

The present disclosure is directed to systems and methods for efficient data processing in a mesh network of computing devices.

Given a set of interconnected devices (which may or may not have an integrated camera) and a set of computational units deployed on the devices, embodiments of the present disclosure recognize a need to construct a processing pipeline on a per-feed, per-image basis that maximizes accuracy, while at the same time operates within system constraints in a mesh network of the devices. In an example, the mesh network may include three types of devices: pure feed device (e.g., a camera without an integrated compute capability), pure computing device (e.g., a device with computing capability but no integrated camera), and hybrid device (e.g., a device with both camera and computing capability). Embodiments of the present disclosure disclose handling a video feed with unknown contents and varied computation needs. Embodiments of the present disclosure disclose automatically characterizing the video feed and constructing a processing pipeline. Embodiments of the present disclosure disclose automatically achieving cost and performance trade-off by considering the limitations of hardware resources, processing speed, accuracy, and application requirements.

Figure 1:
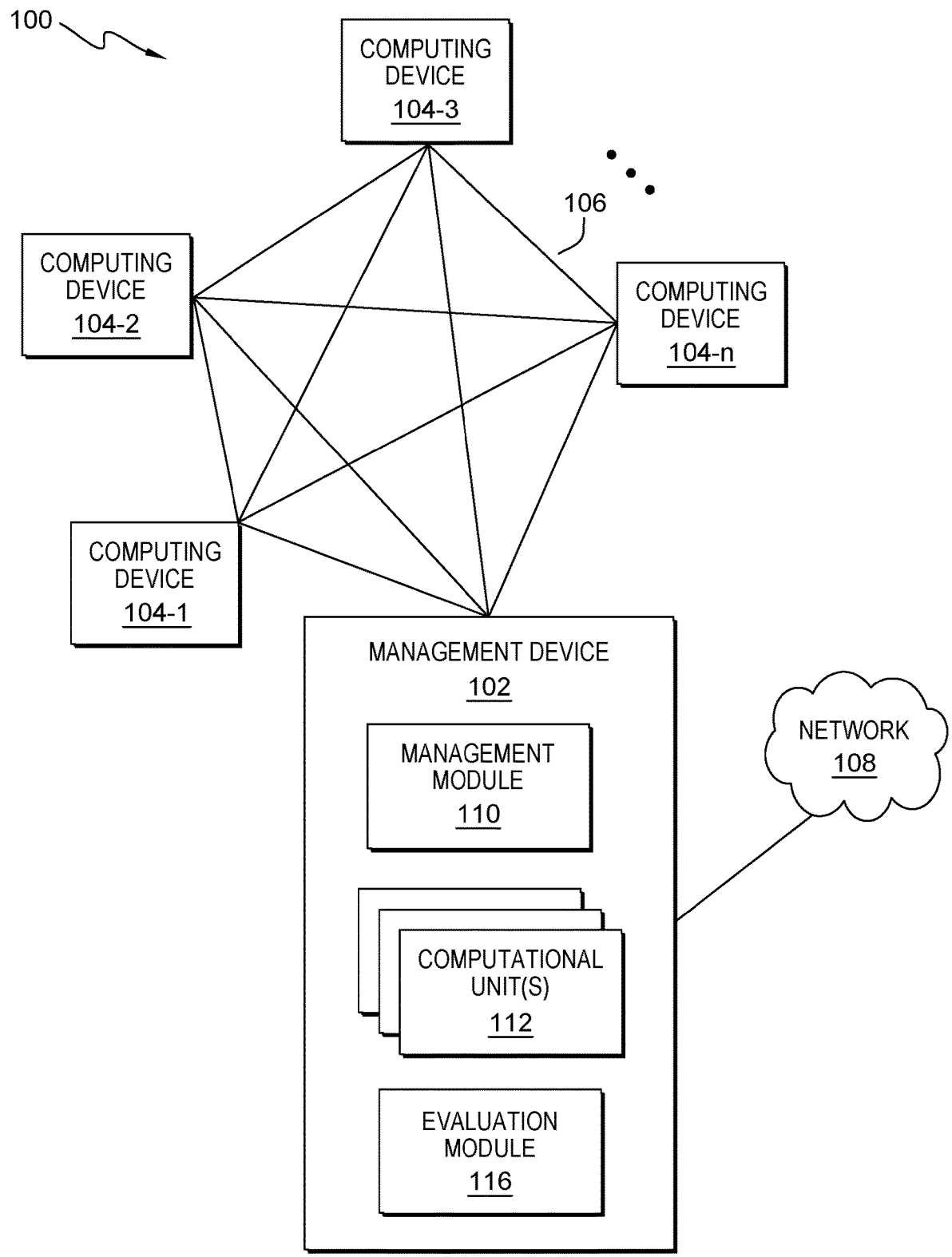
FIG. 1 is a functional block diagram illustrating a data feed environment, in accordance with one or more embodiments of the present disclosure.

The present disclosure will now be described in detail with reference to the Figures. FIG. 1 is a functional block diagram illustrating a data feed environment, generally designated 100, in accordance with one or more embodiments of the present disclosure.

In the depicted embodiment, data feed environment 100 includes management device 102, computing devices 104 (104-1 . . . 104-*n*), and network 108. In the depicted embodiment, computing devices 104 and management device 102 are in mesh network 106. In various embodiments of the present disclosure, computing devices 104 can be interconnected to each other and to management device 102. In some embodiments, computing devices 104 can be interconnected among some of computing devices 104 and management device 102. In some embodiments, computing devices 104 can be with access to network 108 directly or indirectly.

In various embodiments of the present disclosure, computing devices 104 can be a set of interconnected devices which may or may not have an integrated camera. In various embodiments of the present disclosure, computing devices 104 can be a laptop computer, a tablet computer, a netbook computer, a personal computer (PC), a desktop computer, a mobile phone, a smartphone, a smart watch, a wearable computing device, a personal digital assistant (PDA), an embedded computing device, or a server. In another embodiment, computing devices 104 may represent a computing system utilizing clustered computers and components to act as a single pool of seamless resources. In other embodiments, computing devices 104 may represent a server computing system utilizing multiple computers as a server system, such as in a cloud computing environment. In general, computing devices 104 can be any device or a combination of devices with access to management device 102, in accordance with an embodiment of the present disclosure. Computing devices 104 may include internal and external hardware components, as depicted and described in further detail with respect to FIG. 9.

In various embodiments of the present disclosure, management device 102 can be interconnected with computing devices 104. Management device 102 can be a laptop computer, a tablet computer, a netbook computer, a PC, a desktop computer, a mobile phone, a smartphone, a smart watch, a wearable computing device, a PDA, an embedded computing device, or a server. In another embodiment, management device 102 may represent a computing system utilizing clustered computers and components to act as a single pool of seamless resources. In some embodiments, management device 102 may be a management server, a web server, or any other electronic device or computing system capable of processing program instructions and receiving and sending data. In other embodiments, management device 102 may represent a server computing system utilizing multiple computers as a server system, such as in a cloud computing environment. In general, management device 102 can be any computing device or a combination of devices with access to computing devices 104, management module 110, computational unit(s) 112, evaluation module 116, and network 108 and is capable of processing program instructions and executing management module 110, computational unit(s) 112, and evaluation module 116, in accordance with an embodiment of the present disclosure. Management device 102 may include internal and external hardware components, as depicted and described in further detail with respect to FIG. 9.

Further, in the depicted embodiment, management device 102 includes management module 110, computational unit(s) 112, and evaluation module 116. In the depicted embodiment, management module 110, computational unit(s) 112, and evaluation module 116 are located on management device 102. However, in other embodiments, management module 110, computational unit(s) 112, and evaluation module 116 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between management device 102 and management module 110, computational unit(s) 112, and evaluation module 116, in accordance with a desired embodiment of the disclosure.

In one or more embodiments, management device 102 may be a management node in mesh network 106. In the depicted embodiment, only management device 102 is illustrated as the management node in mesh network 106. However, in other embodiments, there can be multiple management nodes in mesh network 106. Mesh network 106 may include computing devices 104 and management device 102. Mesh network 106 may dynamically self-organize and self-configure. Mesh network 106 may enable dynamic distribution of workloads. In the depicted embodiment, mesh network 106 is a fully connected mesh network where each node is connected to every other node in the network, e.g., where computing devices 104 and management device 102 in mesh network 106 are connected to each other. However, in other embodiments, mesh network 106 may be a partially connected mesh network and just some of computing devices 104 and management device 102 are connected to each other directly. Management device 102 may distribute a set of computational units 112 to a set of computing devices 104. Management device 102 may create computational plans for data received in mesh network 106 based on computing devices 104. Management device 102 may store data processing and evaluation results.

In one or more embodiments, management module 110 is configured to receive data to be processed in mesh network 106. In an example, the data can be a video feed. For example, the data can be one or more images from one or more computing devices 104. In an example, some of computing devices 104 can be devices with no or low computing capability. In another example, some of computing devices 104 can be devices with computing capability and be integrated with a camera. In another example, some of computing devices 104 can be without an integrated camera and with computing capability only. Other combination of various computing capability and camera integration of computing devices 104 are possible.

In one or more embodiments, management module 110 is configured to distribute computational unit(s) 112 to computing devices 104. In the depicted embodiment, computational unit(s) 112 are located on management device 102. However, in other embodiments, computational unit(s) 112, may be located externally and accessed through a communication network such as network 108. In an example, computational unit(s) 112 may be data processing algorithms. In another example, computational unit(s) 112 may be a common framework to determine computational unit characteristics, e.g., estimated latency and accuracy. Computing devices 104 in mesh network 106 may collectively characterize feeds by running computational unit(s) 112 on images. Management module 110 may update feed metadata based on outputs of computational unit(s) 112. Management module 110 may broadcast a set of computational units 112 to a set of computing devices 104. Responsive to receiving a selected computation unit 112 by an accepting device in the set of computing devices 104, management module 110 may self-assign the selected computation unit 112 to the accepting device. Management module 110 may broadcast an acceptance of the selected computational unit 112. In some examples, management module 110 may iterate through computational units 112 and may select computational units 112 to fit into each computing device 104. Management module 110 may broadcast each tagged computational unit 112 to mesh network 106. Computing devices 104 in mesh network 106 can select the tagged computational unit 112.

In one or more embodiments, management module 110 is configured to create a computational plan to construct a computational pipeline of a set of computational units 112 to a set of computing devices 104. Management module 110 may consider cost and performance trade-offs by considering limitation of hardware resources, processing speed, accuracy and application requirements. In an example, for each image, management module 110 may create a computational plan, e.g., which computing devices 104 will perform what computational units 112 on the image on the basis of factors including, for example, feed metadata, system constraints, available computational unit(s) 112 for computing devices 104, and computational unit(s) 112 characteristics (e.g., estimated latency and accuracy). In an example, when a feed first comes online, the feed may not have metadata. Management module 110 may determine a per-image plan on the basis of factors including, e.g., processing speed, accuracy, and a factor how well computational unit(s) 112 generalize across the feed. Management module 110 may update feed metadata based on outputs of computational units 112. In other examples, management module 110 may periodically broadcast metadata of computational units 112, for example, at fixed intervals, as new computational units 112 may become available, as single message. Each computing device 104 may select a subset of computational units 112. Once the subset of computational units 112 are selected by each associated computing devices 104, the associated computing devices 104 may broadcast configuration of the associated computing devices 104. Management module may store the configuration of each associated computing devices 104.

In one or more embodiments, management module 110 is configured to execute a computational plan by sending separated data to assigned computing devices 104 and associated computational units 112. In an example, the separated data can be an image data. Management module 110 may arrange computing devices 104 to perform zero or more operations on the image. In an example, management module 110 may arrange some computing devices 104 to skip computation based on the factor that some computing devices 104 may not be assigned an appropriate computational unit 112 or have inferior computational units 112 to other computing devices 104. Given the computational plan generated by management module, each computing device 104 may perform zero or more operations on the image. In some examples, management module 110 may detect a computing device change in mesh network 106. Management module 110 may adjust the computational plan based on the computing device change. In other examples, management module 110 may identify a characterization change of the video feed. Management module 110 may adjust the computational plan to include the characterization change.

In the depicted embodiment, management device 102 includes evaluation module 116. Evaluation module 116 is located on management device 102. However, in other embodiments, evaluation module 116 may be located externally and accessed through a communication network such as network 108. In some embodiments, evaluation module 116 can be a node in mesh network 106. Evaluation module 116 may be configured to characterize accuracy of computational units 112 in real-time for computing devices 104.

Figure 2:
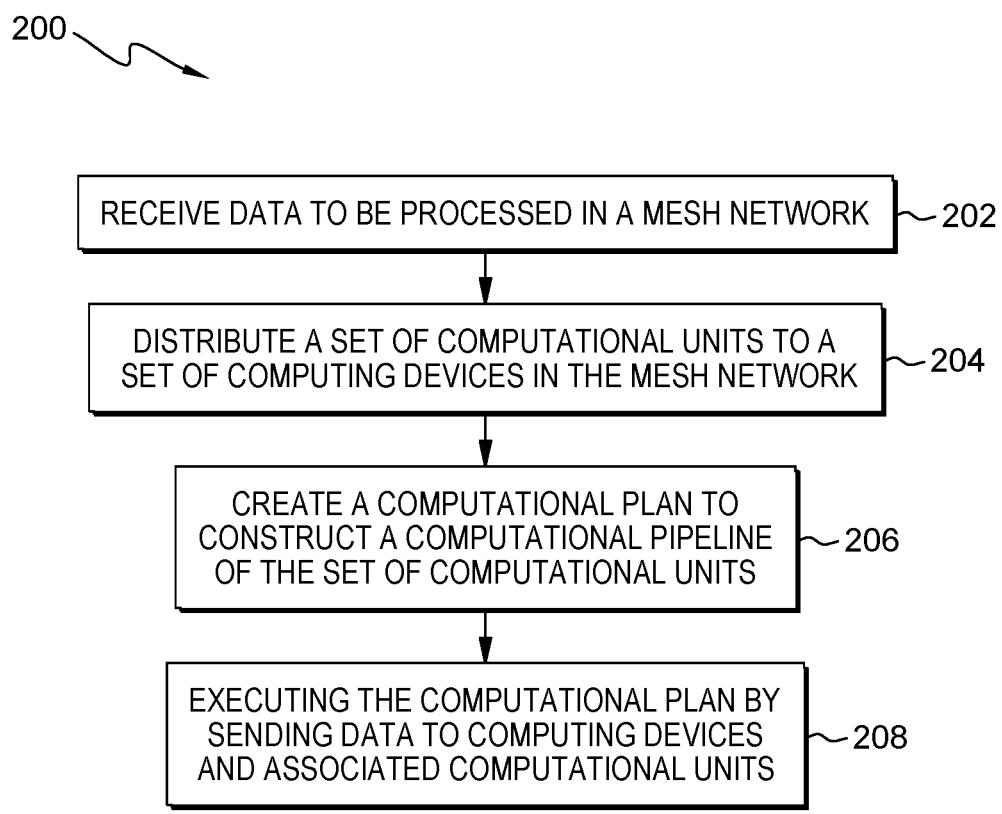
FIG. 2 is a flowchart depicting operational steps of a management module within a management device of FIG. 1, in accordance with one or more embodiments of the present disclosure.

FIG. 2 is a flowchart 200 depicting operational steps of management module 110 in accordance with one or more embodiments of the present disclosure.

Management module 110 operates to receive data to be processed in mesh network 106. Management module 110 also operates to distribute a set of computational units 112 to a set of computing devices 104 in mesh network 106. Management module 110 operates to create a computational plan to construct a computational pipeline of the set of computational units 112. Management module 110 operates to execute the computational plan by sending separated data to assigned computing devices 104 and associated computational units 112.

In step 202, management module 110 receives data to be processed in mesh network 106. In an example, the data can be a video feed. For example, the data can be one or more images from one or more computing devices 104. In an example, some of computing devices 104 can be devices with no or low computing capability. In another example, some of computing devices 104 can be devices with computing capability and be integrated with a camera. In another example, some of computing devices 104 can be without an integrated camera and with computing capability only. Other combination of various computing capability and camera integration of computing devices 104 are possible.

In step 204, management module 110 distributes a set of computational units 112 to a set of computing devices 104 in mesh network 106. In the depicted embodiment, computational unit(s) 112 are located on management device 102. However, in other embodiments, computational unit(s) 112, may be located externally and accessed through a communication network such as network 108. In an example, computational unit(s) 112 may be data processing algorithms. In another example, computational unit(s) 112 may be a common framework to determine computational unit characteristics, e.g., estimated latency and accuracy. Management module 110 may collectively characterize feeds by running computational unit(s) 112 on images. Management module 110 may update feed metadata based on outputs of computational unit(s) 112. Management module 110 may broadcast the set of computational units 112 to the set of computing devices 104. Responsive to receiving a selected computation unit 112 by an accepting device in the set of computing devices 104, management module 110 may self-assign the selected computation unit 112 to the accepting device. Management module 110 may broadcast an acceptance of the selected computational unit 112. In some examples, management module 110 may iterate through computational units 112 and may select computational units 112 to fit into each computing device 104. Management module 110 may broadcast each tagged computational unit 112 to mesh network 106. Computing devices 104 in mesh network 106 can select the tagged computational unit 112.

In step 206, management module 110 creates a computational plan to construct a computational pipeline of the set of computational units 112. Management module 110 may create the computational plan by considering cost and performance trade-offs. Management module 110 may consider limitation of hardware resources, processing speed, accuracy and application requirements of computing devices 104. In an example, for each image, management module 110 may create the computational plan, e.g., which computing devices 104 will perform what computational units 112 on the image on the basis of factors including, for example, feed metadata, system constraints, available computational unit(s) 112 for computing devices 104, and computational unit(s) 112 characteristics (e.g., estimated latency and accuracy). In an example, when a feed first comes online, the feed may not have metadata. Management module 110 may determine the computational plan on the basis of factors including, e.g., processing speed, accuracy, and a factor how well computational unit(s) 112 generalize across the feed. Management module 110 may update feed metadata based on outputs of computational units 112. In other examples, management module 110 may periodically broadcast metadata of computational units 112, for example, at fixed intervals, as new computational units 112 may become available, as single message. Each computing device 104 may select a subset of computational units 112. Once the subset of computational units 112 are selected by each associated computing devices 104, the associated computing devices 104 may broadcast configuration of the associated computing devices 104. Management module may store the configuration of each associated computing devices 104.

In step 208, management module 110 executes the computational plan by sending separated data to assigned computing devices 104 and associated computational units 112. In an example, the separated data can be an image data. Management module 110 may arrange computing devices 104 to perform zero or more operations on the image. In an example, management module 110 may arrange some computing devices 104 to skip computation based on the factor that some computing devices 104 may not be assigned an appropriate computational unit 112 or have inferior computational units 112 to other computing devices 104. Given the computational plan generated by management module, each computing device 104 may perform zero or more operations on the image. In some examples, management module 110 may detect a computing device change in mesh network 106. Management module 110 may adjust the computational plan based on the computing device change. In other examples, management module 110 may identify a characterization change of the video feed. Management module 110 may adjust the computational plan to include the characterization change.

Figure 3:
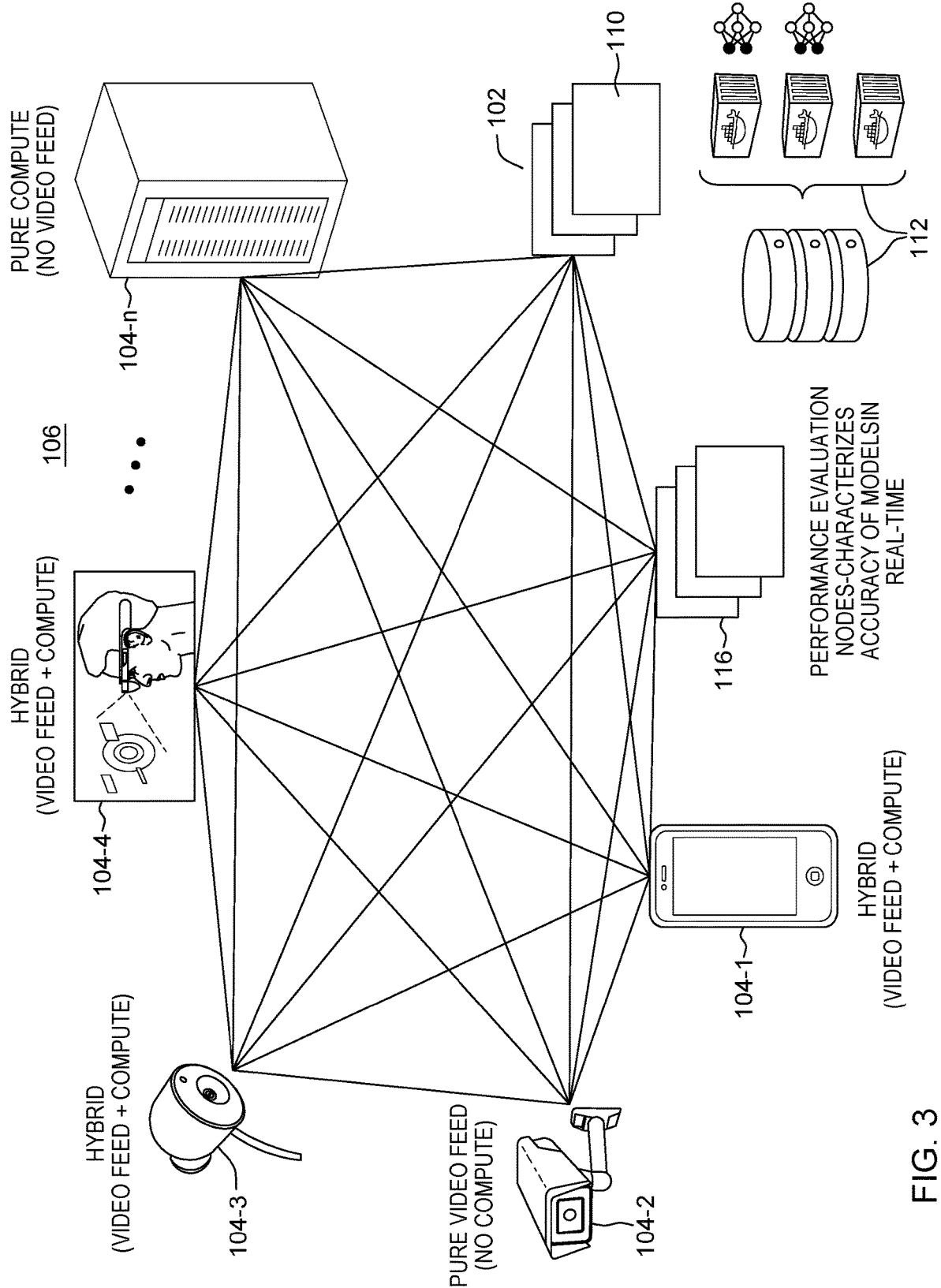
FIG. 3 is an exemplary block diagram illustrating a mesh network, in accordance with one or more embodiments of the present disclosure.

FIG. 3 is an exemplary block diagram illustrating mesh network 106 of data feed environment 100, in accordance with one or more embodiments of the present disclosure.

In the depicted embodiment, mesh network 106 includes computing device 104-1, computing device 104-2, computing device 104-3, computing device 104-4, . . . , computing device 104-n, computational units 112, management device 102, and evaluation module 116. Management device 102 and evaluation module 116 can be nodes in mesh network 106. In the depicted embodiment, evaluation module 116 and computational units are located outside management device 102. However, in other embodiments, evaluation module 116 and computational units 112 can be located on management device 102. In an example, computational units 112 may be data processing algorithms. In another example, computational units 112 may be a common framework to determine computational unit characteristics. Computational units 112 may be located externally and accessed through a communication network such as network 108. Evaluation module 116 may characterize accuracy of computational units 112 in real-time for computing devices 104. In the depicted embodiment, computing devices 104-1, 104-3, 104-4 can be hybrid devices with both video feed and computing functions, for example, a smartphone, a pair of augmented reality glasses, or other suitable devices including an integrated camera with computing function. Computing device 104-2 can be a pure video feed with no computing or inferior computing function, for example, a camcorder. Computing device 104-n can be a pure computing device having computing function without video feed function, for example, a desktop computer without an integrated camera.

Figure 4:
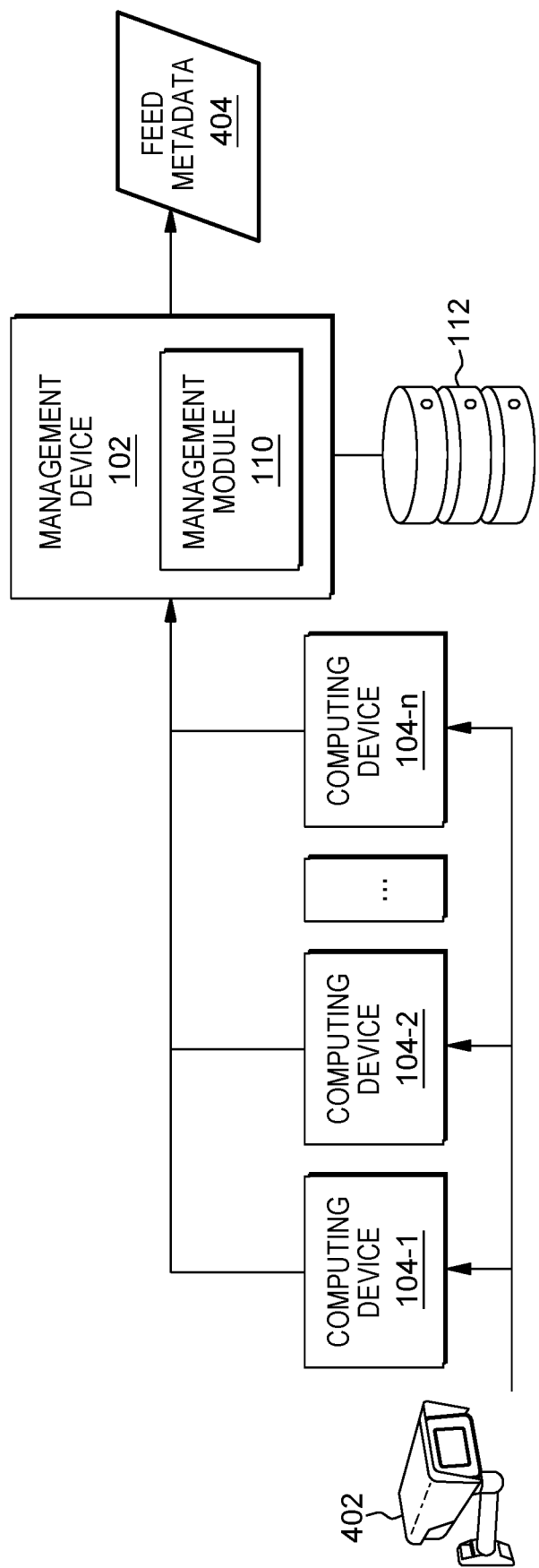
FIG. 4 illustrates an exemplary functional diagram of the management module of the management device of FIG. 1, in accordance with one or more embodiments of the present disclosure.

FIG. 4 illustrates an exemplary functional diagram of management module 110 in mesh network 106 in accordance with one or more embodiments of the present disclosure.

In one or more embodiments of the present disclosure, computing devices 104 may collectively characterize feeds by running computational unites 112 on images, for example, for camera 402. Management module 110 may update feed metadata 404 based on outputs of computational units 112. When a feed first comes online, the feed may not have metadata. Management module 110 may determine a computational plan on the basis of factors including, for example, computing speed and accuracy of computing devices 104 and computational units 112, and how well computational units 112 generalize across the feed.

FIG. 5 illustrates an exemplary feed metadata 404 in accordance with one or more embodiments of the present disclosure.

In the depicted embodiment, feed metadata 404 may include feed ID 502 and descriptors 504. Descriptors 504 may include labels 506 and statistics information 508. Labels 506 may indicate what type of content in the feed. Statistics information 508 may indicate likelihood (frequency) for each labeled content in a specified time frame.

Figure 6:
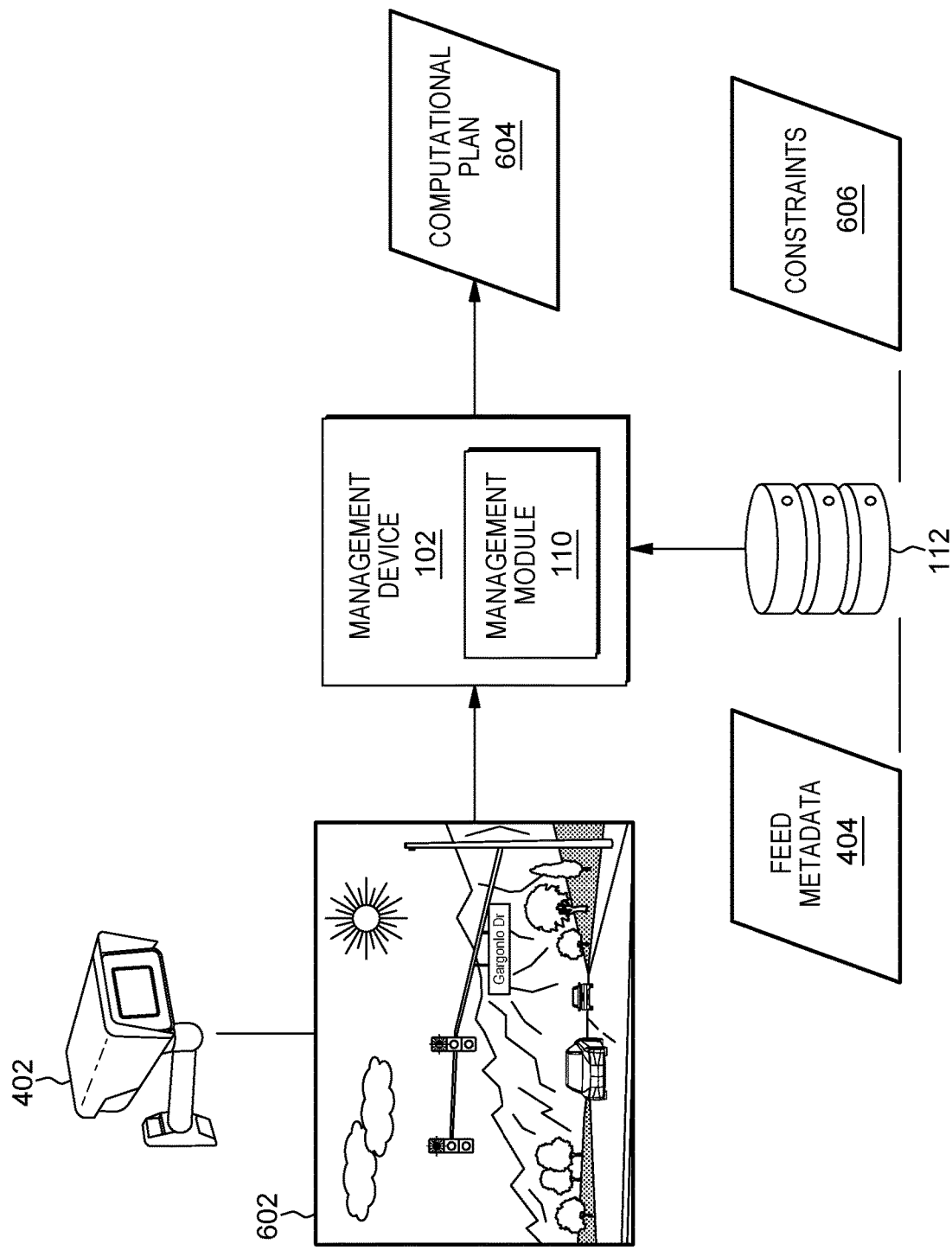
FIG. 6 illustrates an exemplary functional diagram of the management module of the management device of FIG. 1, in accordance with one or more embodiments of the present disclosure.

FIG. 6 illustrates an exemplary functional diagram of management module 110 in mesh network 106 in accordance with one or more embodiments of the present disclosure.

In the exemplary embodiment, management module 110 may create computational plan 604 to construct a computational pipeline of computational units 112. Computational plan 604 may be related to which computing devices 104 will perform what computational units 112 on image 602. Management module 110 may evaluate cost and performance trade-offs by evaluating limitation of hardware resources, processing speed, accuracy and application requirements. In an example, for image 602 through camera 402, management module 110 may create computational plan 604 on image 602 on the basis of factors including, for example, feed metadata 404, system constraints 606, availability of computational units 112 for computing devices 104, and characteristics (e.g., estimated latency and accuracy) of computational units 112. Management module 110 may update feed metadata 404 based on outputs of computational units 112.

Figure 7:
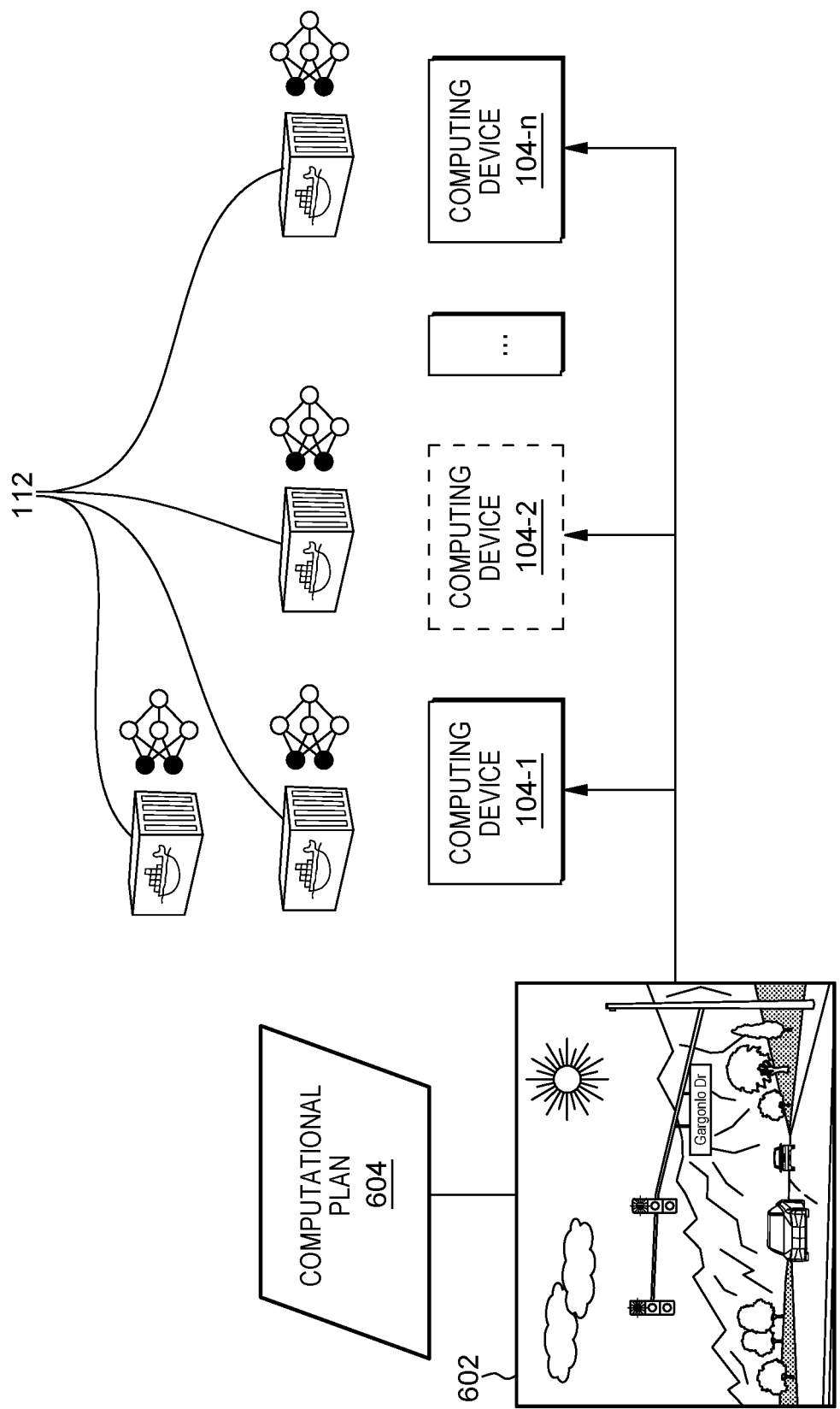
FIG. 7 illustrates an exemplary functional diagram of the management module of the management device of FIG. 1, in accordance with one or more embodiments of the present disclosure.

FIG. 7 illustrates an exemplary functional diagram of management module 110 in mesh network 106 in accordance with one or more embodiments of the present disclosure.

In the exemplary embodiment, management module 110 may execute computational plan 604 by sending image 602 to computing devices 104 and assigned computational units 112. Management module 110 may arrange computing devices 104 to perform zero or more operations on image 602 based on computational plan 604 generated by management module 110. In an example, management module 110 may arrange some computing devices 104 to skip computation based on a factor that some computing devices 104 may not be assigned an appropriate computational unit 112 or have inferior computational units 112 to other computing devices 104. For example, in the depicted embodiment, computing device 104-2 may skip computation based on the factor that management module 110 detects that computing device 104-2 has no appropriate computing capability or has inferior computing capability. In some examples, management module 110 may detect a computing device change in mesh network 106. Management module 110 may adjust the computational plan based on the computing device change. In other examples, management module 110 may identify a characterization change of the video feed. Management module 110 may adjust computational plan 604 to include the characterization change.

FIG. 8 is an exemplary device deployment table 800 illustrating constructing a computational plan with management module 110 in mesh network 106 in accordance with one or more embodiments of the present disclosure.

In exemplary table 800, column 802 lists computing devices 104, e.g., computing devices 104-1, 104-2, 104-3. Column 804 lists names of assigned computational units 112 to computing devices 104. In the depicted example, multiple computational units 112 can be assigned to one computing device 114. For example, computational units 112

("OLOv3" and "Contrast Stretcher") can be assigned to computing device 114-2. Computational units 112 ("Color Classifier" and "KLTTracker") can be assigned to computing device 114-3. Column 806 is a category of computational units 112. For example, the category of computational unit 112 ("Fast R-CNN") is for object detection. Column 808 lists inputs for computational units 112 and computing devices 104. For example, inputs can be image, any object, image sequence, sets of any object, or other suitable inputs for respective computational units 112 and computing devices 104. Column 810 list outputs of computational units 112 and computing devices 104. For example, outputs can be persons, vehicles, images, attribute scores, object tracts, or other suitable outputs for respective computational units 112 and computing devices 104. Column 812 lists exemplary accuracy for respective computational units 112 and computing devices 104. Column 814 lists exemplary latency for respective computational units 112 and computing devices 104. Column 816 lists exemplary likelihood for respective computational units 112 and computing devices 104.

In the depicted example, system constraints 606 may include: 1) maximum latency per image is 33 ms, and 2) minimum accuracy is 0.7. Category priority may be: 1) object detection, 2) semantic segmentation, 3) image classification, 4) temporal processors (trackers, activity recognition models), and 5) preprocessor. Exemplary associated feed metadata 404 for the image can be person 0.8, vehicle 0.1, rabbit 0.05, and telephone booth 0.05. Management module 110 may create an exemplary computational plan 604 for maximizing value of a combination of computational unit 112 accuracy and estimated likelihood within maximum latency of system constraints 606. For example, latency for computational unit 112 ("Faster R-CNN") for computing device 104-1 is 100 ms that is more than maximum latency (33 ms) of system constraints 606 so management module 110 will not deploy computational unit 112 ("Faster R-CNN") for computing device 104-1. In addition, because accuracy for computational unit 112 ("KLT-Tracker") for computing device 104-3 is 0.65 which is lower than the required accuracy (0.7), management module 110 will not deploy computational unit 112 ("KLTTracker") for computing device 104-3. Management module 110 may assign computational units 112 ("YOLOv3" and "Contrast Stretcher") for computing device 104-2, and computational unit 112 ("Image Classifier") for computing device 104-3 for computational plan 604 which meets system constraints 606 while maximizing the example value—the combination of the accuracy score and estimated likelihood.

Figure 9:
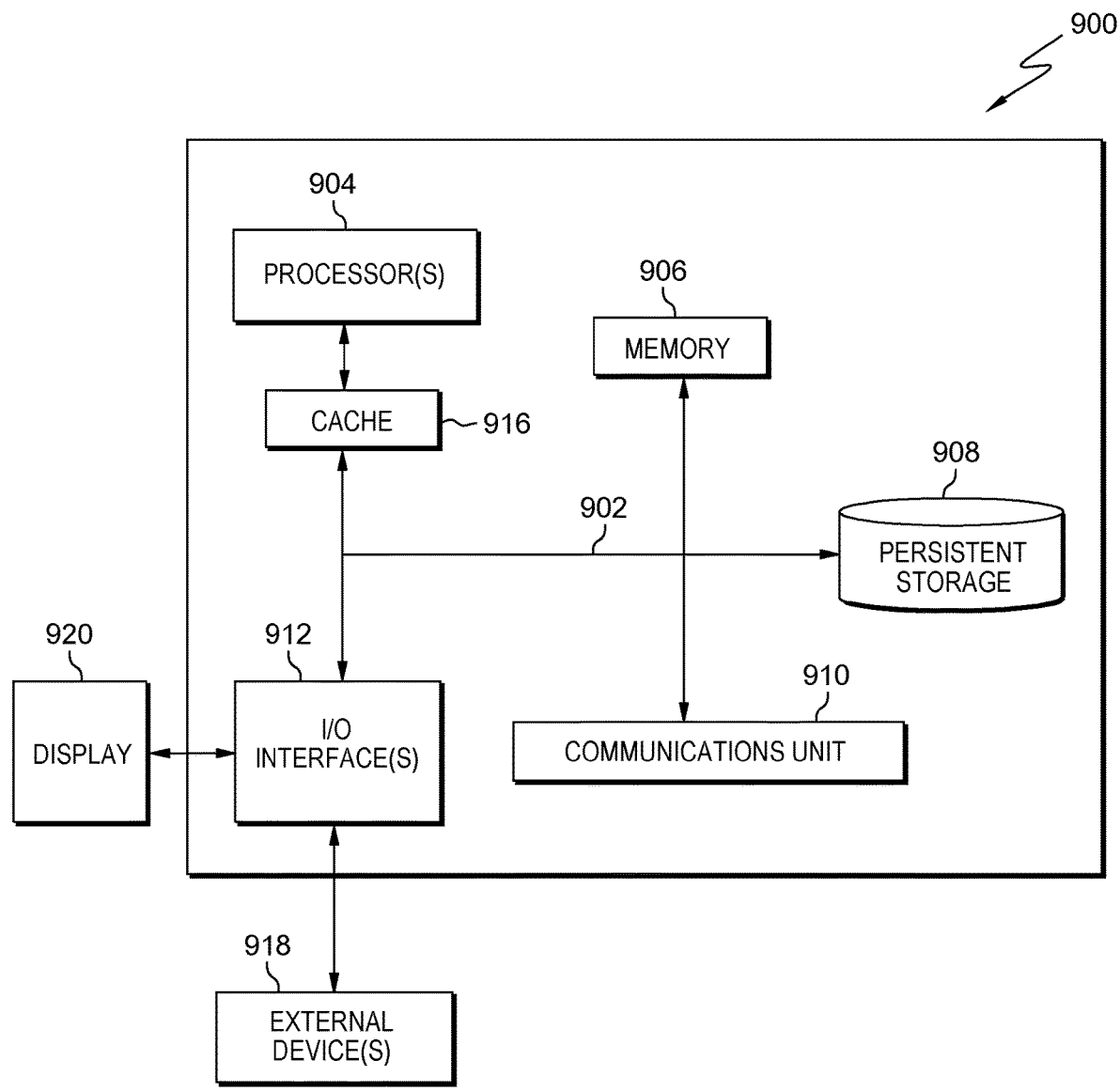
FIG. 9 is a block diagram of components of the management device and computing devices of FIG. 1, in accordance with one or more embodiments of the present disclosure.

FIG. 9 depicts a block diagram 900 of components of management device 102 and computing devices 104 in accordance with an illustrative embodiment of the present disclosure. It should be appreciated that FIG. 9 provides only an illustration of one implementation and does not imply any limitations with regard to the environments in which different embodiments may be implemented. Many modifications to the depicted environment may be made.

Management device 102 and computing devices 104 each may include communications fabric 902, which provides communications between cache 916, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses or a crossbar switch.

Memory 906 and persistent storage 908 are computer readable storage media. In this embodiment, memory 906 includes random access memory (RAM). In general, memory 906 can include any suitable volatile or non-volatile computer readable storage media. Cache 916 is a fast memory that enhances the performance of computer processor(s) 904 by holding recently accessed data, and data near accessed data, from memory 906.

Management module 110, computational units 112, and evaluation module 116 each may be stored in persistent storage 908 and in memory 906 for execution by one or more of the respective computer processors 904 via cache 916. In an embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 910, in these examples, provides for communications with other data processing systems or devices. In these examples, communications unit 910 includes one or more network interface cards. Communications unit 910 may provide communications through the use of either or both physical and wireless communications links. Management module 110, computational units 112, and evaluation module 116 each may be downloaded to persistent storage 908 through communications unit 910.

I/O interface(s) 912 allows for input and output of data with other devices that may be connected to management device 102 and computing devices 104. For example, I/O interface 912 may provide a connection to external devices 918 such as a keyboard, keypad, a touch screen, and/or some other suitable input device. External devices 918 can also include portable computer readable storage media such as, for example, thumb drives, portable optical or magnetic disks, and memory cards. Software and data used to practice embodiments of the present invention, e.g., management module 110, computational units 112, and evaluation module 116 can be stored on such portable computer readable storage media and can be loaded onto persistent storage 908 via I/O interface(s) 912. I/O interface(s) 912 also connect to display 920.

Display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
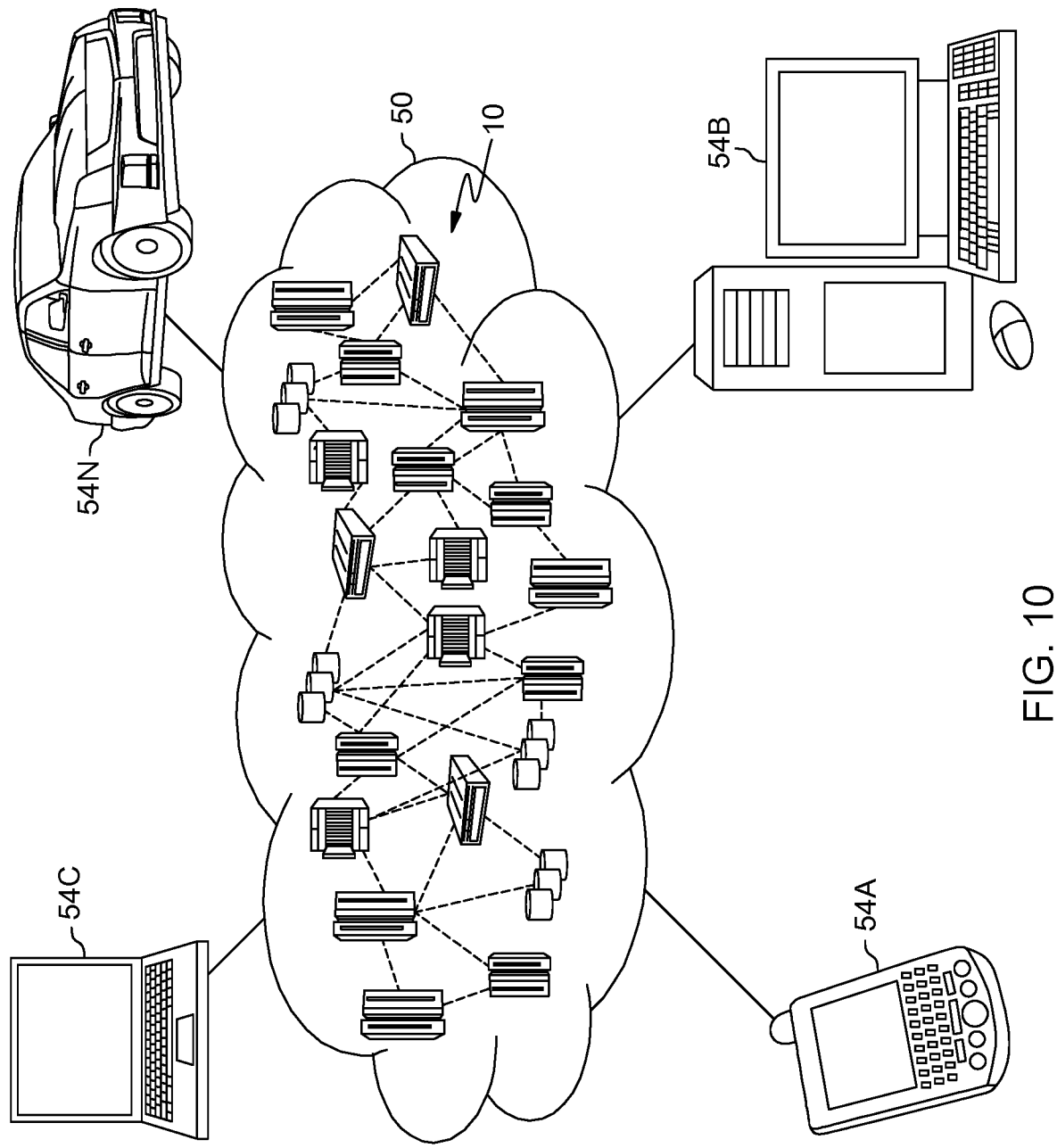
FIG. 10 depicts an embodiment of a cloud computing environment, in accordance with one or more embodiments of the present disclosure.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
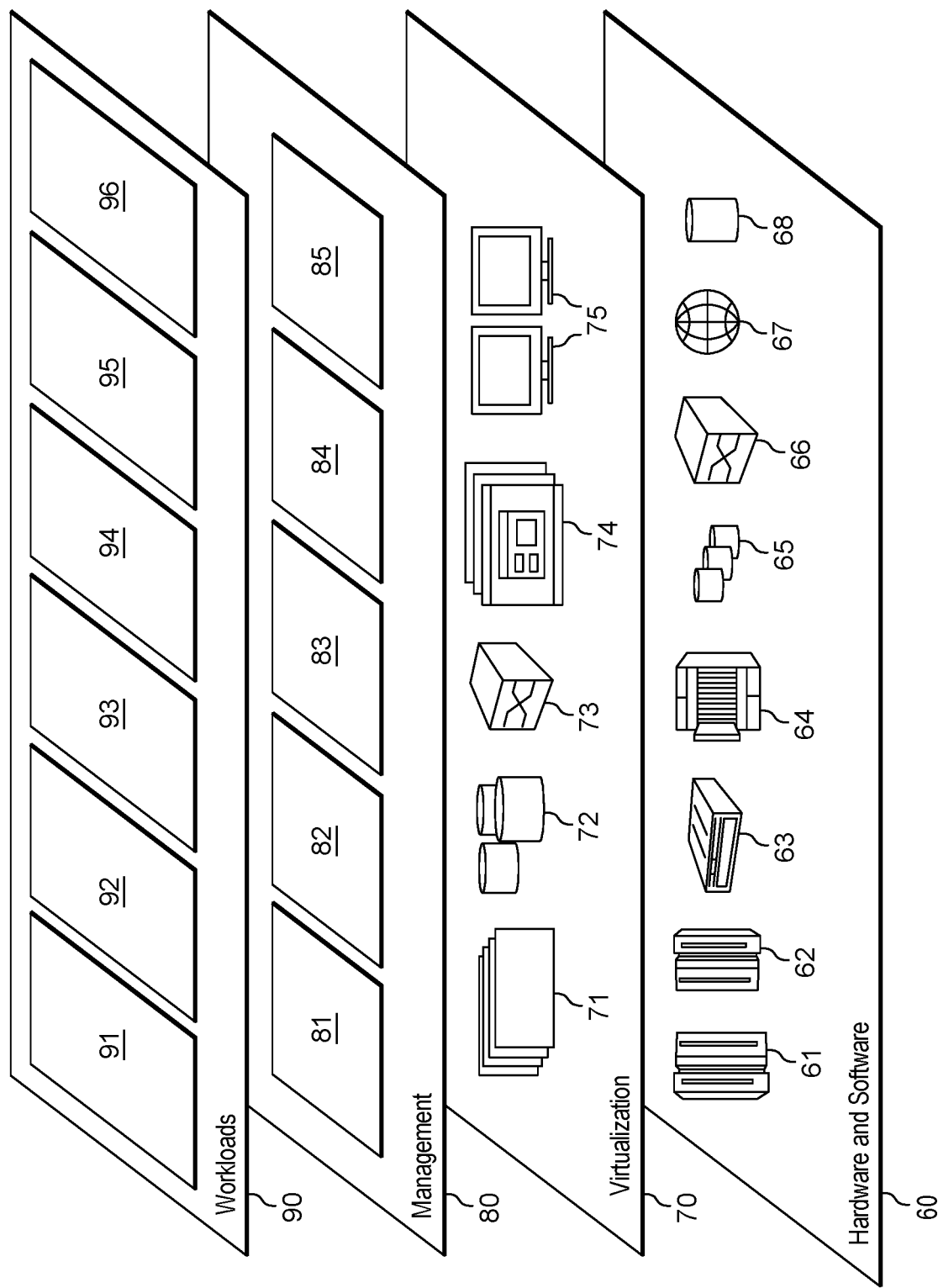
FIG. 11 depicts an embodiment of abstraction model layers of a cloud computing environment, in accordance with one or more embodiments of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, management module 110, computational units 112, and or evaluation module 116 as described above with respect to data feed environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   receiving, by one or more processors, data to be processed in a mesh network including a set of computing devices;
   distributing, by one or more processors, a set of computational units to the set of computing devices in the mesh network;
   creating, by one or more processors, a computational plan to construct a computational pipeline of the set of computational units wherein the computational plan considers cost and performance trade-offs by considering limitation of hardware resources, processing speed, accuracy and application requirements;
   responsive to detecting a device change in the mesh network, adjusting the computational plan based on the device change;
   responsive to identifying a characterization change of the data, adjusting the computational plan to include the characterization change; and
   executing, by one or more processors, the computational plan by sending data to assigned computational units.

2. The computer-implemented method of claim 1, wherein the set of computational units are executables selected from a group consisting of data processing algorithms and a common framework.

3. The computer-implemented method of claim 1, wherein distributing the set of computational units comprises:
   broadcasting the set of computational units to the set of computing devices; and
   responsive to receiving a selected computation unit by an accepting device in the set of computing devices, self-assigning the selected computation unit.

4. The computer-implemented method of claim 3, wherein self-assigning the selected computation unit comprises broadcasting an acceptance of the selected computational unit.

5. The computer-implemented method of claim 1, wherein the data is a video feed.

6. The computer-implemented method of claim 5, wherein the mesh network includes devices selected from a group consisting of video feed device without an integrated computing capability, computing device without an integrated camera, and hybrid device with both camera and computing capability.

7. A computer program product comprising:
   one or more computer readable storage media, and program instructions collectively stored on the one or more computer readable storage media, the program instructions comprising:
   program instructions to receive data to be processed in a mesh network including a set of computing devices;
   program instructions to distribute a set of computational units to the set of computing devices in the mesh network;
   program instructions to create a computational plan to construct a computational pipeline of the set of computational units wherein the computational plan considers cost and performance trade-offs by considering limitation of hardware resources, processing speed, accuracy and application requirements;
   program instructions to, responsive to detecting a device change in the mesh network, adjust the computational plan based on the device change;
   program instructions to, responsive to identifying a characterization change of the video feed, adjust the computational plan to include the characterization change; and
   program instructions to execute the computational plan by sending data to assigned computational units.

8. The computer program product of claim 7, wherein the set of computational units are executables selected from a group consisting of data processing algorithms and a common framework.

9. The computer program product of claim 7, wherein program instructions to distribute the set of computational units comprise:
   program instructions to broadcast the set of computational units to the set of computing devices; and
   program instructions, responsive to receiving a selected computation unit by an accepting device in the set of computing devices, to self-assign the selected computation unit.

10. The computer program product of claim 9, wherein program instructions to self-assign the selected computation unit comprise program instructions to broadcast an acceptance of the selected computational unit.

11. The computer program product of claim 7, wherein the data is a video feed.

12. The computer program product of claim 11, wherein the mesh network includes devices selected from a group consisting of video feed device without an integrated computing capability, computing device without an integrated camera, and hybrid device with both camera and computing capability.

13. A computer system comprising:
one or more computer processors, one or more computer readable storage media, and program instructions stored on the one or more computer readable storage media for execution by at least one of the one or more computer processors, the program instructions comprising:
program instructions to receive data to be processed in a mesh network including a set of computing devices;
program instructions to distribute a set of computational units to the set of computing devices in the mesh network;
program instructions to create a computational plan to construct a computational pipeline of the set of computational units wherein the computational plan considers cost and performance trade-offs by considering limitation of hardware resources, processing speed, accuracy and application requirements;
program instructions to, responsive to detecting a device change in the mesh network, adjust the computational plan based on the device change;
program instructions to, responsive to identifying a characterization change of the video feed, adjust the computational plan to include the characterization change; and
program instructions to execute the computational plan by sending data to assigned computational units.

14. The computer system of claim 13, wherein the set of computational units are executables selected from a group consisting of data processing algorithms and a common framework.

15. The computer system of claim 13, wherein program instructions to distribute the set of computational units comprise:
program instructions to broadcast the set of computational units to the set of computing devices; and
program instructions, responsive to receiving a selected computation unit by an accepting device in the set of computing devices, to self-assign the selected computation unit.

16. The computer system of claim 15, wherein program instructions to self-assign the selected computation unit comprise program instructions to broadcast an acceptance of the selected computational unit.

17. The computer system of claim 13, wherein the data is a video feed.

* * * * *